United States Patent
Nagarajan et al.

(10) Patent No.: US 6,519,367 B2
(45) Date of Patent: Feb. 11, 2003

(54) METHOD AND SYSTEM FOR PROPAGATING SELECTIVE AMOUNTS OF ERROR IN A HYBRID SCREENING DEVICE

(75) Inventors: Ramesh Nagarajan, Fairport, NY (US); William A. Cook, Pittsford, NY (US); Francis K. Tse, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/158,993

(22) Filed: Sep. 23, 1998

(65) Prior Publication Data

US 2002/0057459 A1 May 16, 2002

(51) Int. Cl.[7] .................................................. G06K 9/36
(52) U.S. Cl. ...................................................... 382/252
(58) Field of Search ................................ 382/252, 254; 358/455, 456, 462, 447, 457, 463, 465, 466, 298

(56) References Cited

U.S. PATENT DOCUMENTS

| 5,226,094 A | | 7/1993 | Eschbach | |
| 5,254,982 A | * | 10/1993 | Feigenblatt et al. | 345/148 |
| 5,317,653 A | | 5/1994 | Eschbach et al. | |
| 5,784,488 A | * | 7/1998 | Kuwata | 382/176 |
| 5,787,206 A | * | 7/1998 | Williams et al. | 382/252 |
| 5,933,539 A | * | 8/1999 | Metcalfe et al. | 382/252 |

FOREIGN PATENT DOCUMENTS

| EP | 696129 | * | 2/1996 | H04N/1/405 |

OTHER PUBLICATIONS

An Adaptive Algorithm for Spatial Greyscale—by Robert W. Floyd and Louis Steinberg.

* cited by examiner

Primary Examiner—Jingge Wu
(74) Attorney, Agent, or Firm—Fay, Sharpe, Fagan, Minnich & McKee, LLP

(57) ABSTRACT

A method and system implements selective, memory efficient, control over the amount of error diffused in a hybrid screening system. An image context error computer receives a pixel classification and an error value. Upon receiving these data, a set of shift registers supplies a fractional portion of the error value to an error diffusion circuit. A bypass thresholder receives screened video and applies simple thresholding. In parallel with the simple thresholding, an error diffuser receives screened video and applies error diffusion. The results of the two processes are output to a multiplexer which outputs one based on the pixel classification.

13 Claims, 6 Drawing Sheets

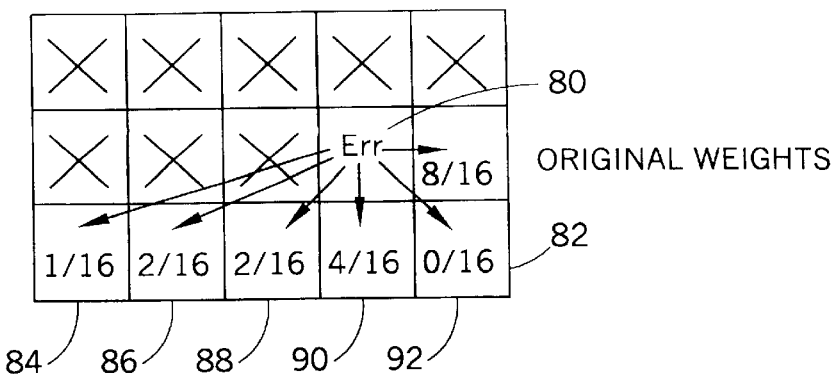
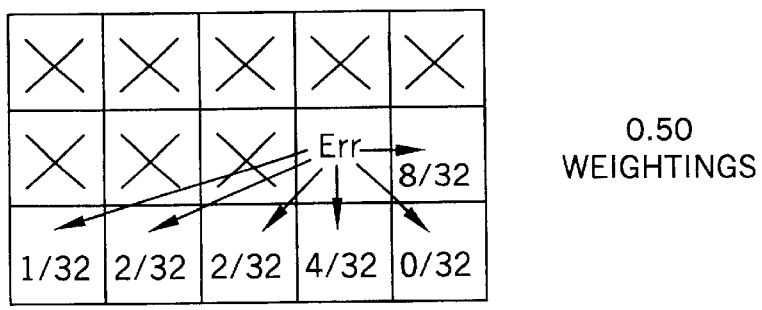
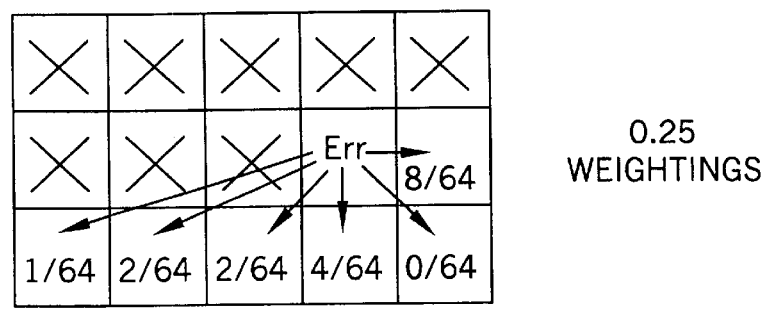
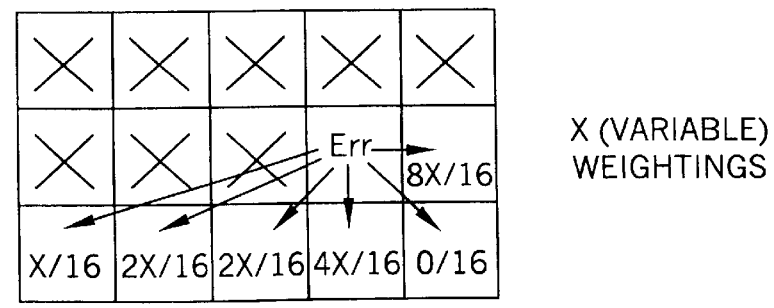

METHOD AND SYSTEM FOR PROPAGATING SELECTIVE AMOUNTS OF ERROR IN A HYBRID SCREENING DEVICE

BACKGROUND OF THE INVENTION

1. Field of the Invention

The invention pertains to the art of image processing systems and, more particularly, to error diffusion techniques for rendering multibit graylevel images containing continuous tone, text, halftones etc. to a binary pattern of dots for the purpose of printing or displaying on an imaging device. More specifically, the present invention is directed to a dynamic error diffusion process for hybrid screening wherein the error diffusion weighting coefficients are dynamically calculated based on a physical characteristic of the image data being processed.

2. Description of Related Art

BACKGROUND OF THE PRESENT INVENTION

Image information, be it color or black and white, is derived by scanning a large number of gray levels; e.g., 256 levels of black and white and more than 16 million levels of color, gray level image data presented as a large multi-level value. The large multi-level value is usually unprintable by standard printers since standard printers print a limited number of levels, either a spot or no spot in a binary printer, or a limited number of levels associated with the spot, for example, four in the quaternary case. Accordingly, it is necessary to reduce the multi-level gray image data to a limited number of levels so that it is printable.

There are many methods of rendering multi-level input gray images on a low level output device. One standard method of converting gray level pixel image data to binary level pixel image data is through the use of dithering or halftoning processes. In such arrangements, over a given area, each gray level pixel within the area is compared to one of a set of preselected thresholds. The effect of such an arrangement is that, for an area where the image is gray, some of the thresholds will be exceeded, while others are not. In the binary case, the pixels in the area in which the threshold is exceeded are printed as black, while the remaining pixels are allowed to remain white. The effect of the distribution of black and white over the given area is integrated by the human eye as gray. Dithering presents problems, however, in that the amount of gray within an original image is not maintained over an area, i.e., the error arising from the difference between the threshold value and the actual gray level value at any particular cell pixel is simply thrown away. This results in loss of image information. However, proper screen design with more graylevels could result in good output image quality.

Algorithms that convert gray images to binary or other number of level images while attempting to preserve the local density include error diffusion processing. Error diffusion can render complex images that contain a mixture of text and picture data reasonably well. The utilization of error diffusion can eliminate the need to have image segmentation which identifies which image data, i.e., pixel, corresponds to text and which pixel corresponds to a picture. Normally, this identification process is necessary so that the picture aspect of the document can be screened and the text aspect of the document can be thresholded.

An example of a typical error diffusion process is fully described in U.S. Pat. No. 5,226,094 to Eschbach entitled "Method for Making Image Conversions With Error Diffusion", the entire contents of which are hereby incorporated by reference. More examples of error diffusion processes with modifications to the error calculation and weight allocation are fully described in U.S. Pat. No. 4,924,322 to Kurosawa et. al., U.S. Pat. No. 4,339,774 to Temple, and U.S. Pat. No. 4,955,065, to Ulichney. The entire contents of U.S. Pat. No. 4,924,322, U.S. Pat. No. 4,339,774, and U.S. Pat. No. 4,955,065 are hereby incorporated by reference.

Error diffusion attempts to maintain gray by making the conversion from gray pixels to binary or other level pixels on a pixel-by-pixel basis. The procedure examines each pixel with respect to a threshold, and the difference between the gray level pixel value and the threshold is then forwarded to a selected group of neighboring pixels, in accordance with a weighting scheme.

Modern digital images increasingly include both text and picture images, thus, attempts have been made to develop an algorithm that produces superior results on input images containing both text/edge segments and contone/halftone segments. For example, FIG. 1 shows such an image. The image is generally designated 10. Included in the image are text segments 12, 14, contone segment 16 and halftone segment 18. Preferably a system would analyze the input image 10, recognize the different segments 12–18, and apply the proper processing to each segment. It is typically desirable to apply a high modulation screen to input image data representative of pictorial elements and a low modulation screen plus an error diffusion technique to input image data representative of text/edge elements. It should be noted that the segments could also include halftones further classified by frequency, edge segments, or background segments for example.

One particular method discussed in U.S. Pat. No. 5,317,653, to Eschbach, is assigned to the assignee of the present invention, and is incorporated herein by reference. Eschbach discloses essentially a hybrid or two step approach. A screen is applied to the input image, then that result is error diffused. In such a hybrid screening approach, a conventional screen is applied to the input video resulting in modified video. Unfortunately, in conventional hybrid screening, one error distribution weight is typically used for the entire image. That is, regardless of which segment the method is processing, a pre-programmed flow of error diffused pixels continues downstream. Artifacts from this "overflow" become most noticeable in transitional regions especially between high modulation screening (i.e. contone/halftone) and low modulation screening (i.e. text/edge).

However, it would be desirable to provide for the application of a plurality of screens at various modulations to help in rendering complex images containing a mixture of text and pictorials. For example, in an 8-bit video system the modified video after the application of a screen is obtained as:

$$\text{Modified Video} = 255 + S - V$$

Where S is a screen threshold value and V is the input video value. The dynamic range of the modified video of a 100% modulated screen (ranging between 0 and 255 for an 8 bit system) would be 0→511. On the other hand, use of a 0% modulation screen (i.e. no screening, only error diffusion with a threshold level of 128), results in the modified video having a dynamic range of 128→383. Other intermediate modulations result in a dynamic ranges from X→Y where 0<X<128, and 511>Y>383.

Ideally, for better rendition of different image segments, the pictorials (continuous tone and halftone) need to be "purely" screened (conventional screening) and text/edges need to be error-diffused. While trying to switch between these two rendering schemes based on segmentation classes, image artifacts are generated due to misclassifications in the transition regions. The hybrid screening approach suggested by Eschbach helps in avoiding artifacts by applying screen and performing error-diffusion everywhere. This though, results in "noisy looking" pictorials due to error-diffusion. Thus, a need exists for a method to apply "pure" screen on pictorials and error-diffusion on text/edges without causing any noticeable image artifacts from propagating error selectively in the transition regions.

An improvement over conventional hybrid screening systems disclosed in commonly assigned U.S. application Ser. No. 08/285,324, is assigned to the assignee of the present invention and incorporated herein by reference. The improvement therein pertains to the set of weighting coefficients used by the error diffusion process. While some error diffusion systems used a fixed set of weighting coefficients selected in the design stage for use on all image types, the Ser. No. 08/285,324 system selects from a stored set of potential weights depending on image classification. In other words, error coefficients are roughly selected based on the classification of the image. Unfortunately, this method relies on a relatively costly memory intensive look-up table. Also the weights are essentially limited to the look-up value and cannot selectively vary—even when such variance may be particularly desirable such as across a transition region.

All the hybrids above diffuse some amount of residual error into transition areas. For example, consider an image undergoing heavy error diffusion (that is, employing maximum weighting coefficients to diffuse image shading information downstream). When this area of heavy error diffusion transitions into an area requiring pure screening (i.e. no error diffusion), the next few scan lines will contain artifacts from the error diffusion process in the transition area. In other words, the errors computed from a previous classification area will undesirably "dump" into the new classification area.

The present invention contemplates a new, efficient method of reducing the artifacts encountered while a hybrid screening system switches between different classifications of input areas.

BRIEF SUMMARY OF THE INVENTION

In accordance with a first aspect of the present invention, a method for diffusing an error generated from thresholding a gray level value representing a pixel is provided. The method includes segmenting an image based on an image characteristic of a pixel within the image and screening the pixel in correspondence with the image characteristic. An an error value for the pixel is then generated, and an image context error is computed corresponding to the error value and the image characteristic. Then the image context error is diffused to a plurality of selected other pixels.

In accordance with another embodiment of the present invention, the processing step includes screening the image signal with a modulation value based on the image characteristic, thereby producing a screened video. Then the diffused image context errors from a previous pixel are added to the screened video thereby producing an error diffused video. The error diffused video is binarized thereby producing an error diffused output video signal.

In accordance with another aspect of the present invention, a method of reducing output image artifacts in an imaging system including a hybrid screening system is provided. The method includes segmenting an image signal in accordance a pixel classification based on a determined image characteristic. Then the image signal is screened with a modulating factor based on the pixel classification, thereby producing a screened video. Both an error diffusion processing thereby producing an error diffused output video signal; and a simple thresholding thereby producing a bypass output video signal are applied in parallel to the screened video. Then an output video signal is selectively generated from either the error diffused output video signal or the bypass output video signal based on the pixel classification.

In yet another aspect of the present invention, there is provided an imaging system including an image segmentation means for segmenting an image signal into a pixel classification based upon selected image characteristics, the image signal having a predetermined number of levels. Also, a screening module for selectively modulating the image signal into a modified video signal based on the pixel classification and a binarization module for converting the modified video signal into a digital output video signal are provided. Also, an error feedback loop for generating an error value, the error value being the difference between the modified video signal and the output video signal and an image context error computer for computing an image context error corresponding to the error value and a pixel classification change factor; along with diffusing means for diffusing the image context error to a plurality of selected pixels are included.

One benefit obtained by use of the present invention is a reduction of artifacts in image transition areas produced by switching of screen modulation levels in a hybrid screening system.

Another benefit obtained by use of the present invention is a simple hardware implementation of controlled error propagation.

Other benefits and advantages of the subject new method will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein:

FIG. 4 is an example of how a variety of percentages of error values are diffused to selected pixels.

DETAILED DESCRIPTION OF THE PREFERRED EMBODIMENT

Figure 1:
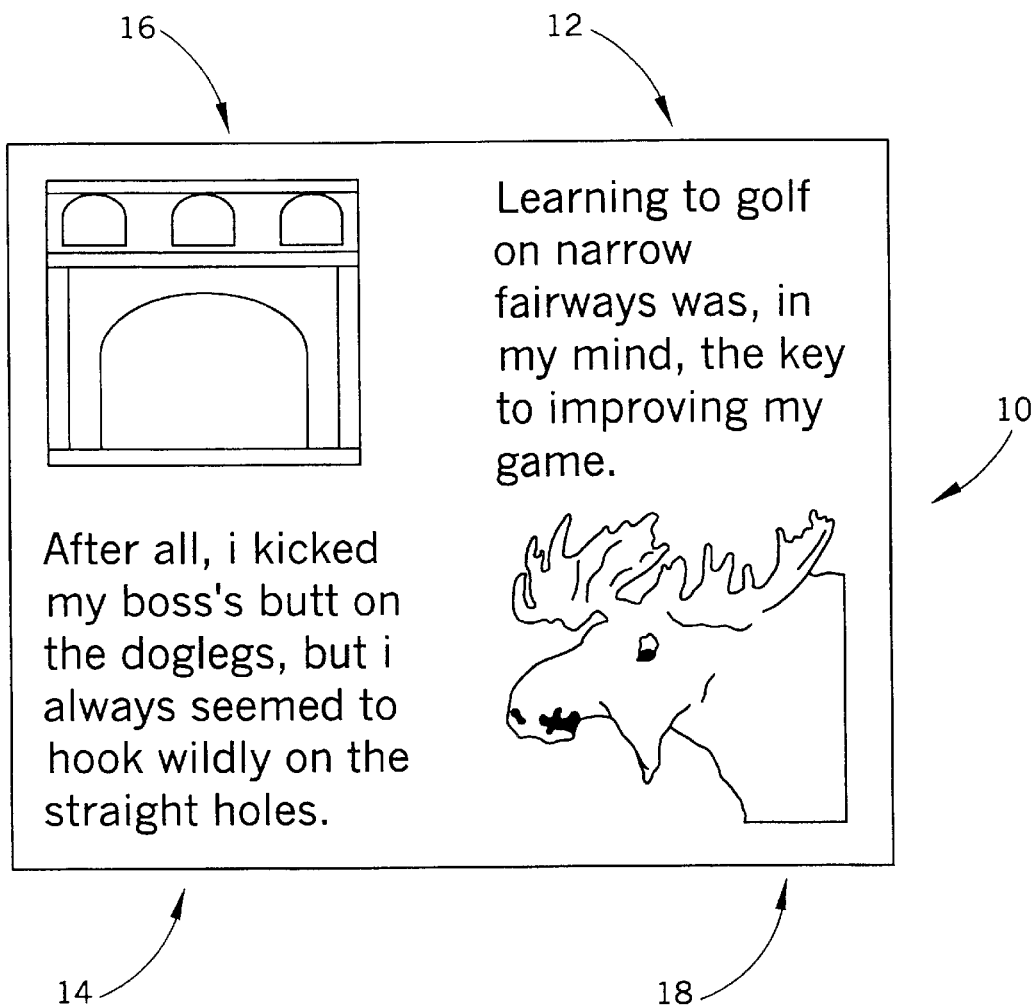
FIG. 1 is a sample image having areas where pixels therein have a predetermined image characteristic.
Figure 2:
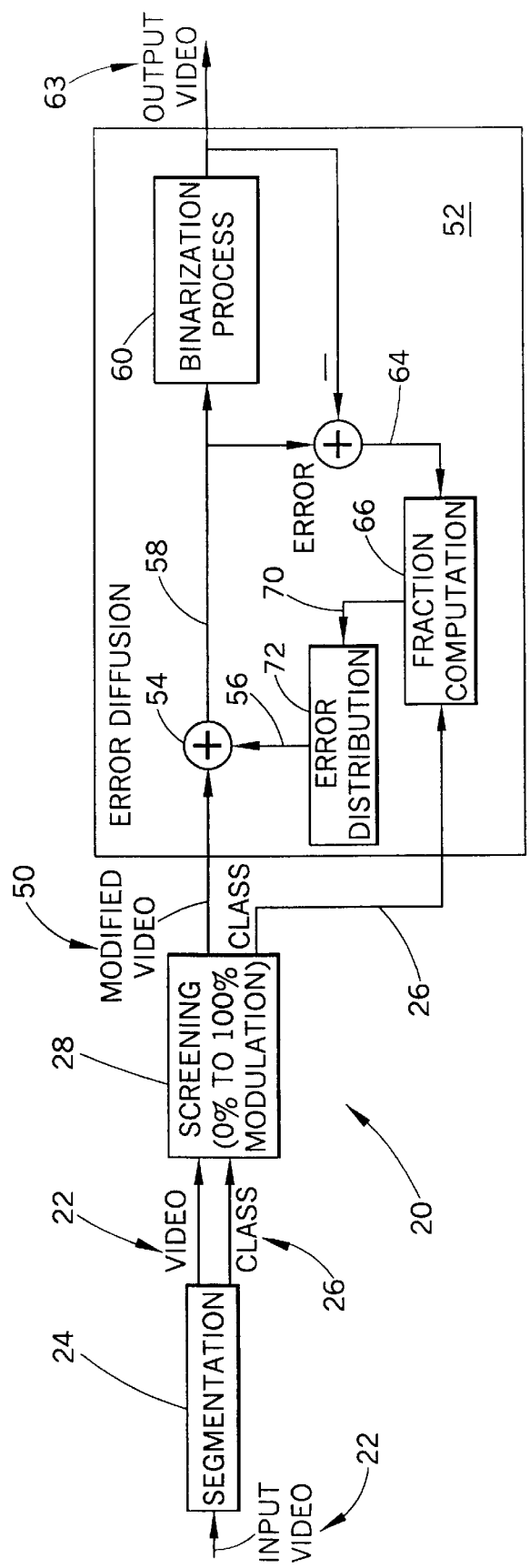
FIG. 2 is a block diagram of an apparatus according to one embodiment of the present invention.

Turning now to the drawings, wherein the showings are for purposes of illustrating the preferred embodiments of the invention, and not for purposes of limiting same, a hybrid digital screening system is shown in FIG. 2 and is generally designated as 20. The hybrid digital screening system 20 embodies the recognition that a way to avoid the problem of artifact generation encountered when a hybrid screening system switches between different image characteristic classifications is to control the error propagated to succeeding pixels based on the determined classification of input image segments. In most cases, all the error would be propagated (as in regular error diffusion). However, when encountering a transition between high percentage modulation screening to low percentage modulation screening (i.e. from contone picture to text), a computational adjustment should be applied to restrict the amount of error diffused. Accordingly, the higher the difference in modulation percentage applied to the input data, the greater restriction on the error to be propagated.

The hybrid digital screening system 20 receives an input pixel data stream 22 representing an image. The pixel stream 22 can be developed by a scanner or other image producing device, or retrieved from a memory device. The hybrid digital screening system 20 is shown receiving an 8-bit image, but can be configured to any image input standard. The input pixel stream 22 is received by a segmentation element 24, which outputs a pixel classification 26 along with the pixel stream 22.

Figure 3:
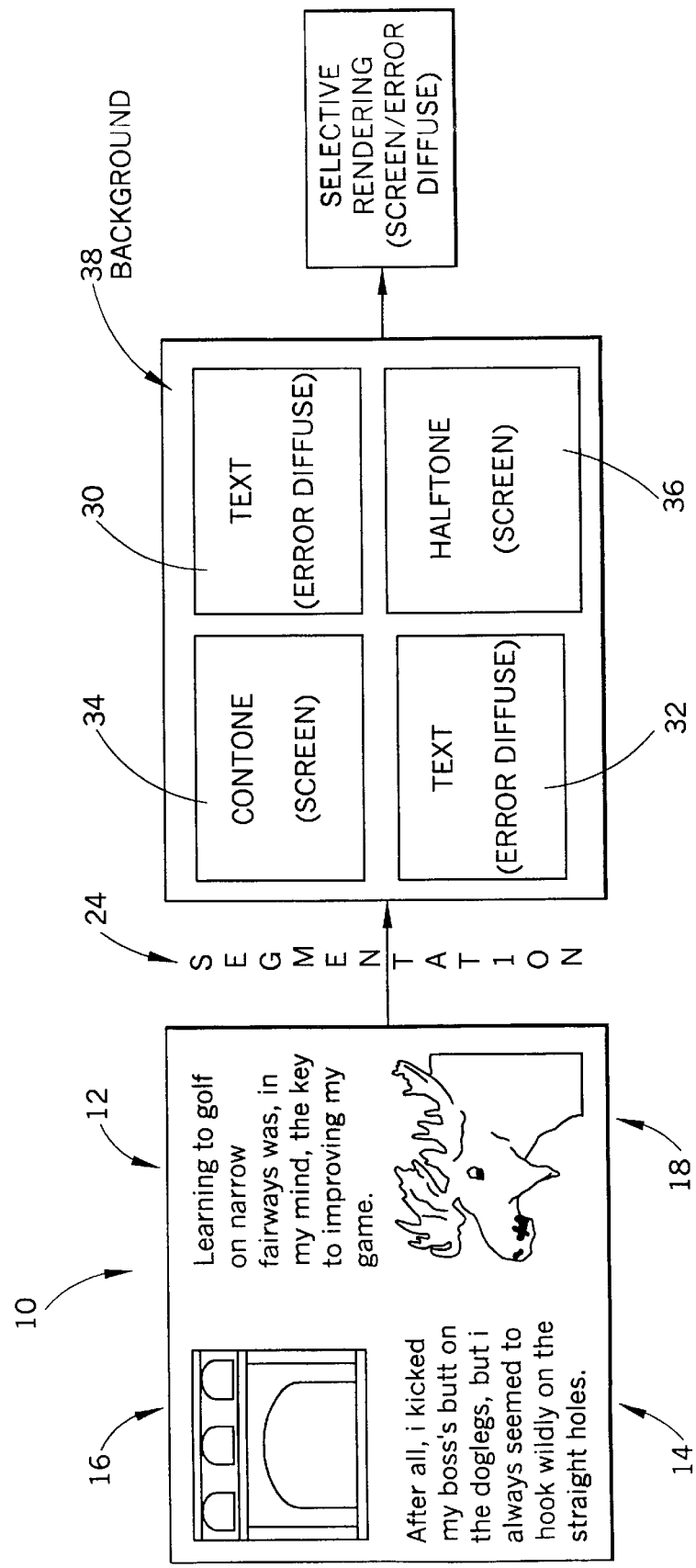
FIG. 3 is an example of segmentation on the sample from FIG. 1.

The classification 26 can be envisioned by cross-referencing FIGS. 2 and 3. The image 10 comprises text segments 12, 14, contone segment 16 and halftone segment 18. The segmentation element 24 receives the input video signal 22, and defines the different segments within the image 10. Thus, segments 12, 14 are classified as text 30, 32; segment 16 is classified as contone 34; and segment 18 is classified as halftone 36. Importantly, the background area 38 is also classified. After segmentation, the pixel stream is selectively rendered based on the classification 26.

Referring back to FIG. 2, both the pixel classification 26 and the pixel stream 22 proceed to the screening module 28. In the screening module 28 the pixel stream 22 is modulated by a screen determined by the pixel classification 26. For example, a pixel stream classified as continuous tone would likely receive 100% modulation, while a pixel stream classified as text would likely receive no modulation. The modulated pixel stream is output and referred to as a modified video signal 50 and is output along with the pixel classification 26 to an error diffuser 52.

The error diffuser 52 comprises an adder 54, a binarization or threshold processor 60, an error feedback loop 64, a fractional computer 66 and an error distributor 72. The adder 54 adds diffused errors 56 from previous pixels to the modified video signal 50. These diffused errors 56 will be discussed below, but the result out of the adder 54 is known as error diffused video 58. The error diffused video 58 proceeds to a binarization processor 60 which then produces a digital output video signal 62 which is made by conventional thresholding methods. That is, the value of the input is compared to a threshold and a binary value is output dependent on the comparison. For example, assume 256 possible input values and a threshold of 128. If the input value is below 128, then the processor 60 will output a zero. On the other hand, if the input value is greater than or equal to 128 the processor 60 will output a one.

Figure 2A:
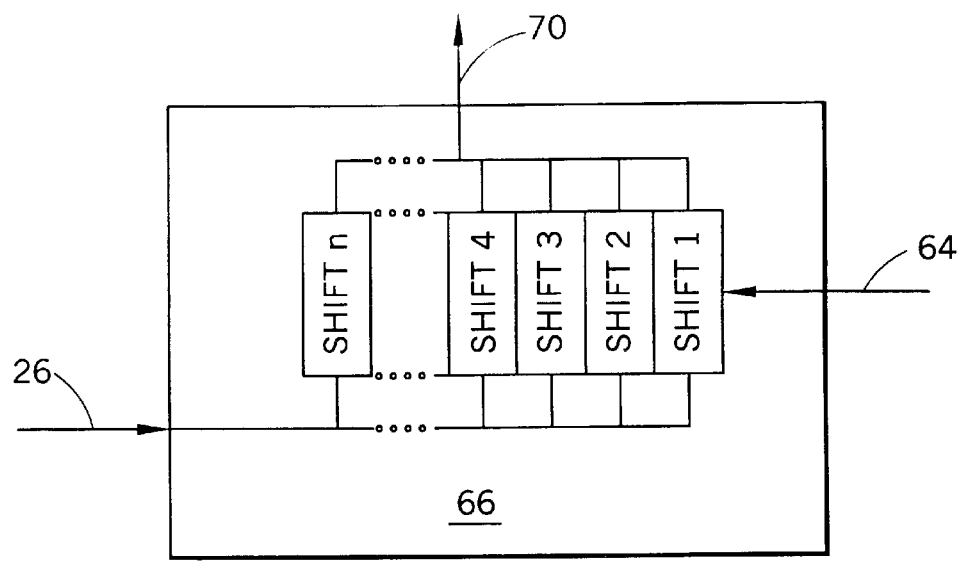
Figure 2B:
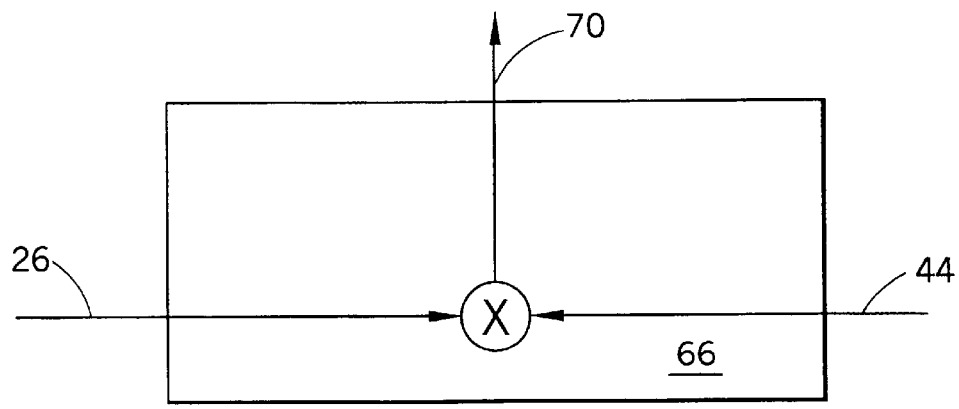

As can now be seen, this thresholding induces errors in the output video. Using the same example as above, if the input value is 186, then processor 60 will output a one. This is, however, 70 too dark (256−186=70). To account for this error, an error feedback loop is included which subtracts the digital output video 62 from the error diffused video 58 resulting in an error value 64. A fractional/ computer 66 then provides a fraction of the error value 64 called image context error 70 to error diffusing means 72 provide the diffused errors 56 to the adder 54. The fractional computer 66 determines the amount of error propagated to downstream pixels based on the pixel classification 26. For example, in an area undergoing a high percentage modulation, i.e. a pictorial image, the fractional portion of error value 64 passed through the computer 66 will preferably be 0%. In a presently preferred embodiment, suitably implemented by the device in FIG. 2A, the fractional computer 66 comprises a plurality of fractional values in a shift register 68. In an alternate embodiment, suitably implemented by the device in FIG. 2B, the fractional computer 66 comprises a full multiplier capable of outputting any fraction of the error value 64. The image context error 70 then proceeds to an error diffusing means or distributor 72.

Referencing FIG. 4A a sample operation of the error diffuser 72 is shown. An error value 80 is shown in a sample pixel grid and the arrows indicate the selected pixels 82–92 which will receive the diffused error. A typical set error diffusion weights is listed in the selected pixels 82–92. For example, pixel 82 has a fractional value of 8/16. In FIG. 4B a sample propagation resulting from a 50% weighted look-up table is shown. FIG. 4C shows the result from a sample 25% weighted look-up table. FIG. 4D shows a variable set of error diffusion weights dependent on the classification of the input pixel 26. It is now apparent that if image context error 70 contains a fractional value of 0 in a variable error diffuser 52, the error diffusion process is effectively stopped resulting in a pure screened and thresholded output video 62.

Figure 5:
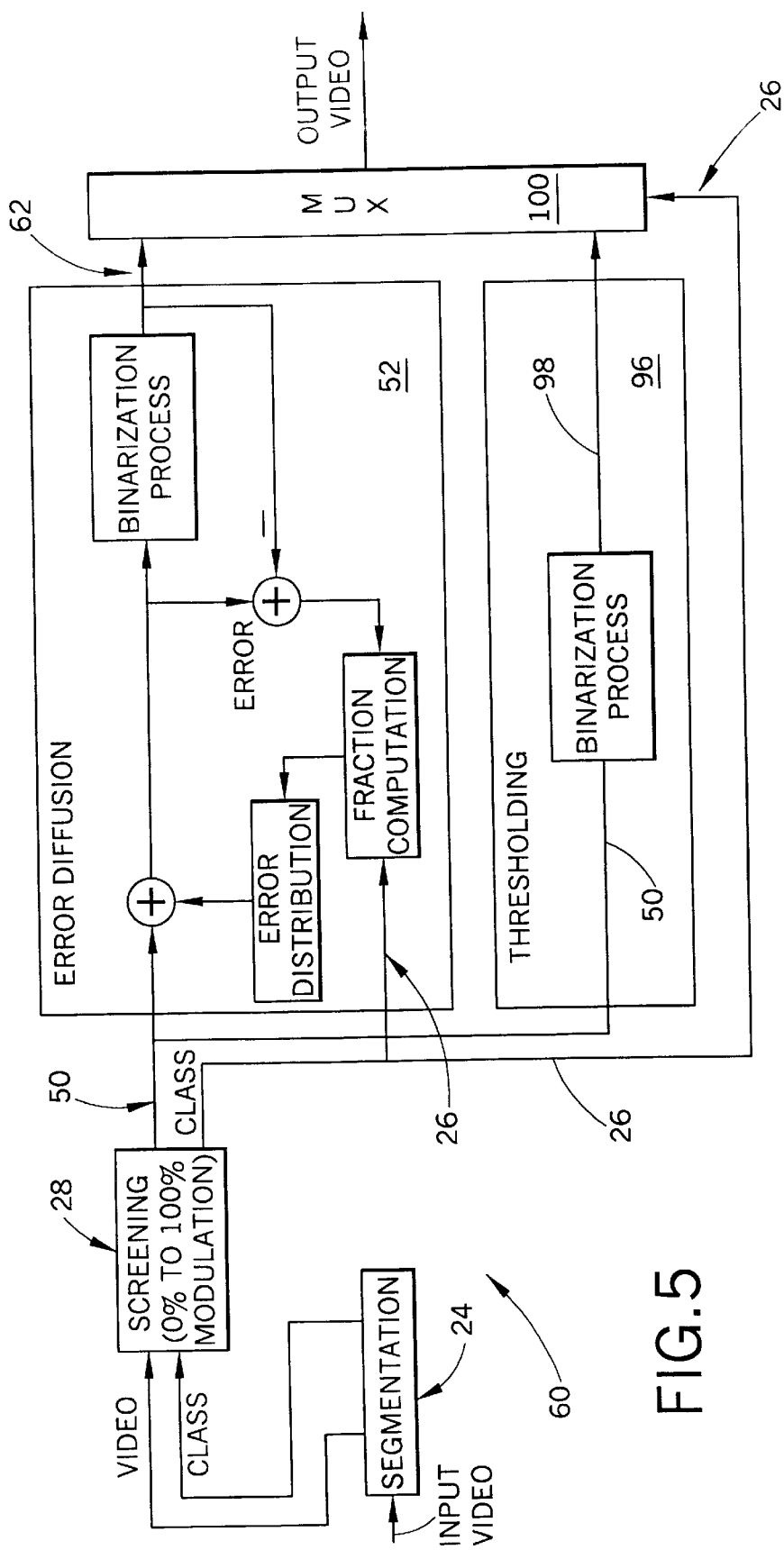
FIG. 5 block diagram of an alternate embodiment of the present invention.

FIG. 5 shows an alternative embodiment generally designated 94. The hybrid digital screening system 94 recognizes another way to avoid the problem is to cease downstream error diffusion immediately in certain classifications in addition to either conventional error diffusion or error diffusion as discussed above in reference to FIG. 2. Thus, the system 94 includes an error diffuser 52 identical in all essential respects to that discussed above. Additionally, the system 94 includes a bypass binarization module 96 for converting a modified video signal 50 into a bypass digital output video signal 98. The system 94 then provides the dual outputs, i.e. digital output video signal 62 and bypass digital output video signal 98 to a multiplexer 100. The multiplexer 100 receives these data streams and outputs one based on the value of the pixel classification 26. So, for example, pictorial areas the pixel classification 26 would cause the multiplexer 100 to output "purely screened" output video 98. On the other hand, if the value of pixel classification 26 were changing towards text/edge classification, progressively more of the error would be distributed. The parallel computation of error-diffused output 62 and "purely screened" output 98 enables the error diffusion circuitry to continuously compute the error generated for each output video, thus preventing artifacts caused by errors diffused from previous pixels (not just the neighboring pixels).

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described our invention, we now claim:

1. A method of processing a digital image for output comprising:

segmenting an image based on an image characteristic of a pixel within the image;

screening the image in correspondence with the image characteristic;

generating an error value for the screened image;

computing an image context error from data including the error value and the image characteristic;

diffusing the image context error to a plurality of selected other pixels;

pixels; and binarizing the screened image producing a stream of binarized pixels; and selectively outputting the error diffused other pixels or the binarized pixels, based on the image characteristic.

2. The method of processing a digital image as set forth in claim 1, wherein the image characteristic comprises a pixel disposed in a transition region and the computing includes selectively varying a computing factor relative to a position of the pixel within the transition region.

3. The method of processing a digital image as set forth in claim 1, where the computing comprises:

multiplying the error value and a fraction selected based on the image characteristic.

4. The method of processing a digital image as set forth in claim 1, where the computing comprises:

shifting the error value by a number of bits determined from the image characteristic.

5. A method of reducing output image artifacts in an imaging system including a hybrid screening system comprising:

segmenting an image signal in accordance with a pixel classification based on a determined image characteristic;

screening the image signal with a modulating factor based on the pixel classification, thereby producing a screened video;

applying in parallel to the screened video both:
an error diffusion processing thereby producing an error diffused output video signal; and,
a simple thresholding thereby producing a bypass output video signal; and, selectively generating as an output video signal either the error diffused output video signal or the bypass output video signal based on the pixel classification.

6. The method of claim 5 further comprising:

adding errors diffused from previous pixels to the screened video thereby producing an error diffused video;

binarizing the error diffused video thereby producing the error diffused output video signal;

subtracting the error diffused output video signal from the error diffused video thereby generating an error value; and diffusing the error value to a plurality of selected pixels.

7. The method of claim 5 further comprising:

adding errors diffused from previous pixels to the screened video thereby producing an error diffused video;

binarizing the error diffused video thereby producing the error diffused output video signal;

subtracting the error diffused output video signal from the error diffused video thereby generating an error value;

multiplying the error value by an image context fraction, the image context fraction being based on the pixel classification, thereby producing an image context error; and diffusing the error value to a plurality of selected pixels.

8. A method of selectively diffusing an error generated from thresholding an input value representing a first pixel, said method comprising:

assigning an image characteristic to the first pixel, said image characteristic being selected from a plurality of defined image characteristics;

thresholding the input value representing the first pixel;

generating an error value as a result of the thresholding step;

determining an amount of the error value to be diffused, said amount being determined from the image characteristic assigned to the pixel, wherein for at least one of the defined image characteristics less than all of the error value is diffused; and, diffusing the determined amount of the error value among a plurality of selected other pixels based on the location of the selected other pixels relative to the first pixel.

9. An imaging system comprising:

imaging segmentation means for segmenting an image signal into a pixel classification based upon selected image characteristics, the image signal having a predetermined number of levels;

a screening module for selectively modulating the image signal into a modified video signal based on the pixel classification;

a binarization module for converting the modified video signal into a digital output video signal;

an error feedback loop for generating an error value, the error value being the difference between the modified video signal and the output video signal;

an image context error computer for computing an image context error corresponding to the error value and a pixel classification change factor;

diffusing means for diffusing the image context error to a plurality of selected pixels;

a bypass binarization module for converting the modified video signal into a bypass digital output video signal; and a multiplexer for receiving the digital output video signal and the bypass digital output video signal, the multiplexer selectively allowing one of the video signals to be output based on the pixel classification change.

10. The imaging system of claim 9 wherein the image context error computer comprises a plurality of shift operators for generating percentages of the error value.

11. The imaging system of claim 10 wherein the image context error computer is a full multiplier operator for generating any fraction of the error value.

12. A system for diffusing an error generated from thresholding a gray level value representing a pixel, comprising:

image segmentation means for assigning an image characteristic to a pixel within an image;

a threshold means for thresholding said pixel and for generating an error value as a result of the thresholding process;

computing means, operatively connected to said image segmentation means, for computing a set of weighting coefficients based on the assigned image characteristic of said pixel, a total of said set of weighting coefficients adding up to a variable fractional amount based upon the assigned image characteristic of said pixel; and diffusing means, operatively connected to said threshold means and computing means, for diffusing the error value to selected pixels based on the computed set of weighting coefficients.

13. The system as set forth in claim 12, wherein said image segmentation means determines whether the pixel within the image is text, continuous tone, halftone, or transition region such that the image characteristic reflects a determined image type.

* * * * *